Jan. 4, 1938.  F. C. BEST  2,104,182
MOTOR VEHICLE
Filed June 30, 1934    2 Sheets-Sheet 2
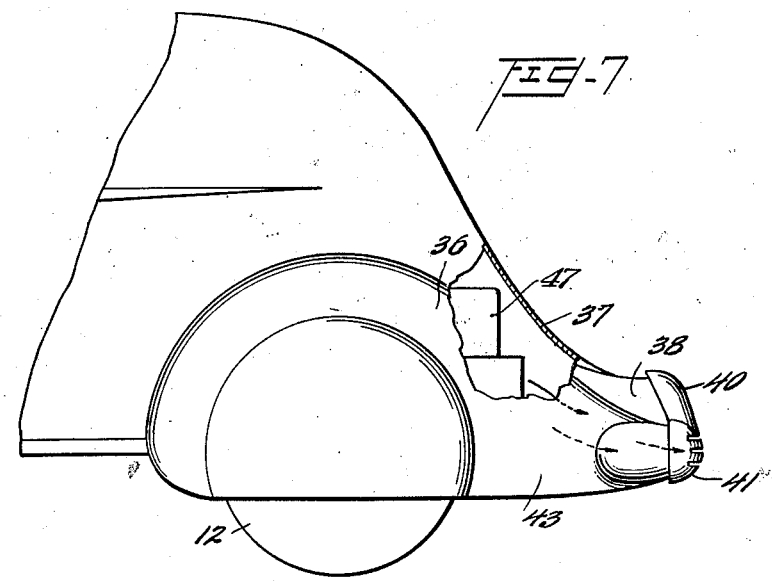
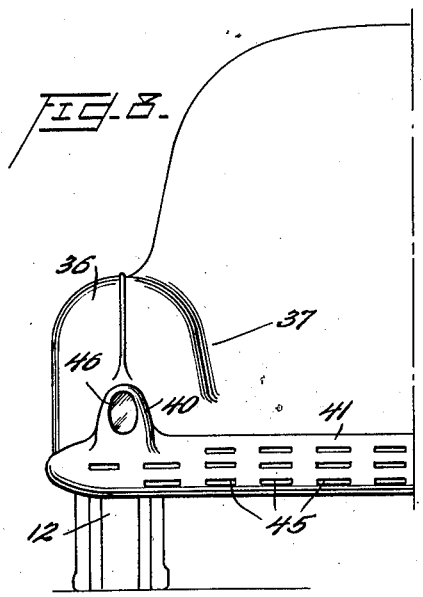
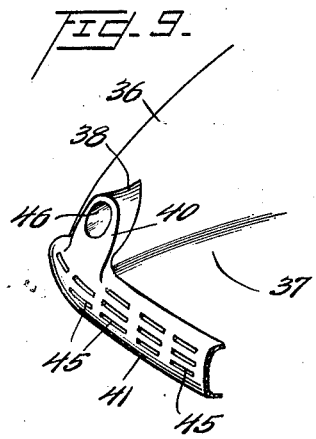

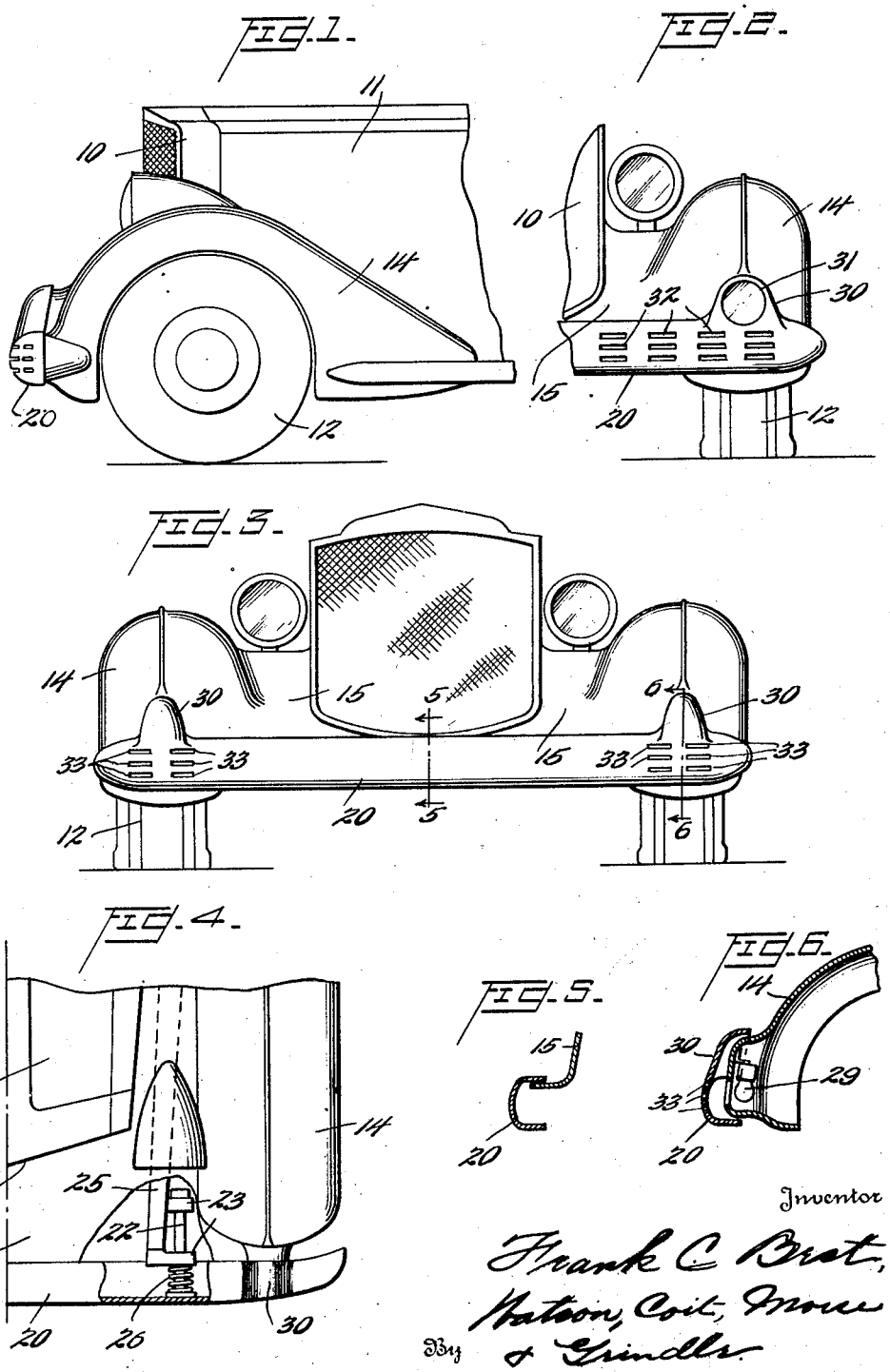

Patented Jan. 4, 1938

2,104,182

UNITED STATES PATENT OFFICE 2,104,182

MOTOR VEHICLE

Frank C. Best, Detroit, Mich., assignor to Packard Motor Car Company, Detroit, Mich., a corporation of Michigan Application June 30, 1934, Serial No. 733,316

4 Claims. (Cl. 293—55)

This invention relates to motor vehicles and more particularly to a combined body and bumper construction having as its principal feature the reduction to a minimum of wind resistance.

The streamlining of motor vehicles is recognized as a very important factor in developing maximum speed with a minimum expenditure of power and in recent years efforts have been made to radically modify vehicle body design and to locate within the body various accessories previously supported externally of the body, it having been found that at extremely high speeds the air resistance offered by spare tires, headlamps, and the like largely offsets any advantage gained by streamlining of the body itself. It has nevertheless been customary to disregard the effect of the bumpers at either end of the vehicle, these bumpers being normally spaced forwardly and rearwardly of the vehicle body and therefore contributing in no small degree to the total wind resistance.

It is therefore proposed in accordance with the present invention to so construct and dispose the bumpers as to assist in the establishment of proper streamlining of the vehicle as a whole. Thus it is one of the objects of the present invention to associate the bumpers more directly with the vehicle body so that the bumpers and body form in effect a streamlined unit, care being taken to ensure that the necessary fore and aft relative movement of the bumpers and body may be executed with the same facility as if these elements were spaced to a considerable extent as in the conventional construction.

It is a more specific object of the invention to provide a bumper at either end of the vehicle which forms in effect a continuation of the downwardly and outwardly curved vehicle body panel, including the fenders and the apron therebetween, the bumper being preferably generally U-shaped in cross section and receiving the body panel in the concave side thereof.

It is a feature of the invention that the bumper is substantially rigid and is yieldingly supported for fore and aft movement on the vehicle frame, integral climb guards being formed on the bumper which may serve the further purpose of providing a streamlined housing for a source of illumination. In the event the invention is applied to a vehicle of the type in which the driving motor is located at the rear, it is proposed to provide the rear bumper with suitable apertures to afford adequate ventilation for the motor.

Further objects and features of the invention will be apparent from the following description taken in connection with the accompanying drawings, in which Figure 1 is a side elevation of the forward portion of a vehicle illustrating the application of the invention thereto;

Figure 2 is a partial front elevation of the structure shown in Figure 1;

Figure 3 is a front elevational view illustrating a slightly modified construction;

Figure 4 is a partial plan view of the structures shown in Figure 1;

Figures 5 and 6 are fragmentary sectional views on the lines 5—5 and 6—6 respectively of Figure 3;

Figure 7 is a side elevation of the rear end of a vehicle to which the present invention is applied;

Figure 8 is a partial rear elevation corresponding to Figure 7; and

Figure 9 is a fragmentary perspective view of the structure shown in Figures 7 and 8.

In order to facilitate an understanding of the principles of the invention, specific language will be employed in describing the several embodiments thereof illustrated in the accompanying drawings. It will nevertheless be understood that by the use of detailed language no limitation of the scope of the invention is intended and that various modifications and alterations of the illustrated structure are contemplated such as would ordinarily occur to one skilled in the art to which the invention relates.

Referring now to Figures 1 to 6 inclusive in which the invention is shown as applied to the forward end of a vehicle body, it will be observed that the vehicle is provided with the usual radiator shell 10 and bonnet 11, the forward wheels being indicated at 12. Fenders 14 extend over the wheels, these fenders, together with an intermediate apron portion 15, extending forwardly of and downwardly from the radiator shell 10, comprising what may be referred to for convenience as a body panel, it being understood that the fenders and apron may be either separately or integrally formed but will present a generally downwardly and forwardly curved structure, the curvature being preferably determined in accordance with the recognized principles of streamlining.

A bumper 20, preferably rigid and extending transversely across the vehicle body, is disposed in close proximity to the forward portion of the body panel and is preferably generally U-shaped in vertical section to receive the body panel therein, the upper leg of the U forming in effect a continuation of the panel and curving downwardly and forwardly from the latter. The disposition of the intermediate apron portion 15 of the panel is indicated more particularly in Figure 5 of the drawings while the manner in which the fender portion 14 of the panel is received within the bumper 20 is shown in Figure 6, it being obvious that the bumper and the body panel may telescope to an extent sufficient to permit the bumper to move rearwardly upon colliding with some object without injury to the panel.

The bumper may be supported on the vehicle frame in any convenient manner but is preferably provided with rigid guide members 22 in the form of rearwardly extending bars which are slidably received in cooperating guide members 23 carried by the side frame members 25 at opposite sides of the vehicle, coil springs 26 surrounding the guide members 22 and being interposed under compression between the bumper at each end of the forward guide members 23. The construction is preferably such that under no circumstances is the bumper permitted sufficient rearward movement to contact the body panel which is received therein.

At either side of the vehicle the bumper 20 is provided with an upstanding climb guard 30 which is preferably formed integrally with the bumper and which may be recessed as indicated at 31 in Figure 2 to receive and support a source of illumination such as a parking lamp, the lens of the lamp being so disposed as to avoid injury thereto when the car climb guard strikes an obstruction. Openings 32 may be provided in the bumper over the entire length thereof for the purpose of ventilation.

Figure 3 illustrates a slightly modified form of bumper which is provided with a plurality of openings 33 in the body at either side thereof so that a parking lamp or roadlight may be located within the bumper and displayed through the openings as indicated at 29 in Figure 6.

Figures 7 to 9 illustrate a similar arrangement as applied to the rear of a vehicle, the rear fenders 36 forming with an intermediate apron 37 a rearwardly and downwardly extending body panel, the apron and the fenders being formed integrally or separately as may be desired. Each fender is preferably provided with a narrowed rearwardly directed portion 38 which is received in an upstanding climb guard 40 and the body of the bumper 41 is of substantially U-shaped section as described with reference to the bumper at the forward end of the vehicle. The body panel including the fenders 36 and intermediate apron portion 37 merge with the bumper and are preferably telescoped therein so as to permit relative fore and aft movement, the bumper being yieldingly supported to permit this movement as described hereinbefore. The streamlining effect may be completed by forming the fenders 36 to provide a wheel fairing 43 laterally of the road wheels 12. It will be observed that the bumper forms in effect the rearward end of the outwardly curved, tail-like projection constituted by the body panel and extending entirely across the rear of the vehicle to reduce to a minimum the formation of eddying air currents when the vehicle is operated at high speed.

This type of construction may be readily employed in the type of vehicle in which the motor 47 is disposed at the rear, the bumper being apertured as indicated at 45 to afford ventilation for the motor. The tail lamps 46 may be recessed within the upstanding climb guards 40 as described hereinbefore.

It is obvious that the shape of the bumper may be altered materially without departing from the principles of the invention, it being essential only that the bumper be located in close proximity to and form in effect a continuation of the body panel to prevent the interruption of the streamlining which occurs when the normally spaced bumper is employed.

Having thus described the invention, what is claimed as new and desired to be secured by Letters Patent is:

1. In a motor vehicle, the combination with a body panel disposed at one end of the vehicle and curving downwardly and outwardly of the body to afford a streamlined effect, of a bumper extending transversely of the vehicle body and disposed in close juxtaposition to the body panel to afford a continuation of the streamline of the panel, said bumper being substantially rigid and having an upstanding climb guard formed integrally therewith, and a source of illumination recessed within said climb guard.

2. In a motor vehicle, the combination with a body panel disposed at one end of the vehicle and curving downwardly and outwardly of the body to afford a streamlined effect, of a bumper extending transversely of the vehicle body and disposed in close juxtaposition to the body panel to afford a continuation of the streamline of the panel, said bumper being provided with apertures, and a source of illumination carried by said panel and disposed at the rear of said bumper and effective through said apertures.

3. In a motor vehicle having a rearwardly disposed motor, the combination with a body panel disposed at the rear end of the vehicle and curving downwardly and outwardly of the body to afford a streamlined effect, of a bumper extending transversely of the vehicle body and disposed in close juxtaposition to the body panel to afford a continuation of the streamline of the panel, said bumper being formed to provide ventilating openings for the motor.

4. In a motor vehicle, the combination with a streamlined body panel disposed at one end of the vehicle and comprising fenders at either side and an intermediate apron portion, of a bumper extending transversely of the vehicle and disposed in close proximity to said panel, said panel terminating in an outwardly and downwardly directed curved portion approaching the horizontal, said bumper being generally U-shaped in vertical section with the upper leg of the U forming in effect a continuation of the panel, said bumper being provided adjacent each side with an upstanding climb guard receiving a forwardly directed extension of the adjacent fender.

FRANK C. BEST.